United States Patent
Xiao

(10) Patent No.: US 12,236,040 B2
(45) Date of Patent: Feb. 25, 2025

(54) PRESSURE POSITION BASED RESPONSE FUNCTION CONTROL METHOD AND ELECTRONIC DEVICE

(71) Applicant: Lenovo (Beijing) Limited, Beijing (CN)

(72) Inventor: Qihua Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/958,869

(22) Filed: Oct. 3, 2022

(65) Prior Publication Data

US 2023/0168772 A1    Jun. 1, 2023

(30) Foreign Application Priority Data

Nov. 30, 2021   (CN) .......................... 202111441170.X

(51) Int. Cl.
  *G06F 3/041*    (2006.01)
  *G06F 3/01*     (2006.01)
  *G06F 3/0354*   (2013.01)

(52) U.S. Cl.
  CPC ............ *G06F 3/0418* (2013.01); *G06F 3/013* (2013.01); *G06F 3/0414* (2013.01); *G06F 3/03547* (2013.01)

(58) Field of Classification Search
  CPC .............................. G06F 3/0418; G06F 3/013
  See application file for complete search history.

(56) References Cited

U.S. PATENT DOCUMENTS

| | | | | |
|---|---|---|---|---|
| 2004/0027334 A1* | 2/2004 | Wu | ......................... | G06F 3/021 345/168 |
| 2004/0030811 A1* | 2/2004 | Liu | ......................... | G06F 3/023 710/14 |
| 2011/0002096 A1* | 1/2011 | Thorson | ................. | G06F 1/1692 361/679.04 |
| 2015/0099546 A1* | 4/2015 | Heo | ......................... | G01S 5/017 455/456.3 |
| 2016/0373631 A1* | 12/2016 | Kocienda | ................ | H04N 23/62 |
| 2020/0233538 A1* | 7/2020 | Aurongzeb | ............. | G06F 1/166 |
| 2020/0326845 A1* | 10/2020 | Lee | ..................... | G06F 3/0412 |
| 2021/0004114 A1* | 1/2021 | Park | ..................... | G06F 3/04166 |
| 2021/0072846 A1* | 3/2021 | Jang | ...................... | G06F 3/1423 |

* cited by examiner

*Primary Examiner* — Chun-Nan Lin
(74) *Attorney, Agent, or Firm* — ANOVA LAW GROUP, PLLC

(57) ABSTRACT

A response function control method is applied to an electronic device. The method includes obtaining information of a first position where pressure on the electronic device is applied and turning off a response function of a second area neighboring to a first area where the first location belongs.

19 Claims, 3 Drawing Sheets

PRESSURE POSITION BASED RESPONSE FUNCTION CONTROL METHOD AND ELECTRONIC DEVICE

CROSS-REFERENCE TO RELATED APPLICATION

This application claims priority to Chinese Patent Application No. 202111441170.X, filed on Nov. 30, 2021, the entire content of which is incorporated herein by reference.

TECHNICAL FIELD

The present disclosure generally relates to the electronic device response technology and, more particularly, to a response function control method and electronic device.

BACKGROUND

With the new demands of the market and the development of technologies, response technologies are broadly applied to electronic devices. A plurality of response circuits are arranged on an electronic device to improve user experience. However, when the plurality of response circuits are arranged on the electronic device, some problems may occur. For example, an auxiliary screen is arranged on a right side of a touchpad of the laptop, and the auxiliary screen is a touch screen. When a user uses response circuits such as a keyboard and a touchpad to control a primary screen of the laptop, the user can easily touch the response module of the auxiliary screen. Thus, the control of the primary screen may be affected, operation efficiency may be affected, and processing resources may be wasted.

SUMMARY

Embodiments of the present disclosure provide a response function control method that is applied to an electronic device. The method includes obtaining information of a first position where pressure on the electronic device is applied and turning off a response function of a second area neighboring to a first area where the first location belongs.

Embodiments of the present disclosure provide an electronic device, including a memory and a processor. The memory stores a computer program. The processor is coupled with the memory and, when the computer program is executed, configured to obtain information of a first position where pressure on the electronic device is applied and turn off a response function of a second area neighboring to a first area where the first location belongs.

Embodiments of the present disclosure provide a non-transitory computer-readable medium storing a computer program that, when executed by a processor, causes the processor to obtain information of a first position where pressure on the electronic device is applied and turn off a response function of a second area neighboring to a first area where the first location belongs.

In the control method of embodiments of the present disclosure, the first area where the pressure on the electronic device is located may be determined in real-time. Then, the response function of the second area neighboring to the first area may be turned off. Thus, the user may not mistakenly touch the second area when performing the operation on the first area. Thus, the operation efficiency corresponding to the first area may not be affected, and the waste of the processing resources caused by starting the response function of the second area because the user mistakenly touches the second area may be avoided.

DETAILED DESCRIPTION OF THE EMBODIMENTS

Various aspects and features of the present disclosure are described with reference to the accompanying drawings.

Various modifications may be made to embodiments of the present disclosure. Therefore, the specification should not be regarded as limiting, but merely as examples of embodiments of the present disclosure. Those skilled in the art may think of other modifications within the scope and spirit of the present disclosure.

The accompanying drawings, which are included in and constitute a part of the specification, illustrate embodiments of the present disclosure. The accompanying drawings, a general description of the present disclosure, and a detailed description of embodiments of the present disclosure are used to explain the principle of the present disclosure.

These and other features of the present disclosure will become obvious through the following description of embodiments, which is given as the non-limiting examples, with reference to the accompanying drawings.

Although the present disclosure has been described with reference to some specific examples, those skilled in the art may realize many other equivalents of the present disclosure. These equivalents may have the features as described in the claims and thus within the scope defined by the claims.

The above and other aspects, features, and advantages of the present disclosure may become more apparent based on the following detailed description in connection with the accompanying drawings.

Specific embodiments of the present disclosure are described with reference to the accompanying drawings. However, embodiments of the present disclosure are merely examples of the present disclosure, which may be implemented in various manners. Well-known and/or repeated functions and structures are not described in detail to avoid obscuring the present disclosure with unnecessary or redundant details. Therefore, specific structural and functional details of the present disclosure are not intended to be limiting, but merely used as a basis for the claims and a representative basis used to teach those skilled in the art to variously employ the present disclosure in substantially any suitable detailed structure.

This specification may use the phrases "in one embodiment," "in another embodiment," "in yet another embodiment," or "in other embodiments," which may all refer to one or more of same or different embodiments of the present disclosure.

A response function control method of embodiments of the present disclosure may avoid the problems that the operation efficiency is impacted, and the processing resources are wasted. To facilitate the understanding of the present disclosure, the response function control method of the present disclosure may be described in detail first.

Figure 1:
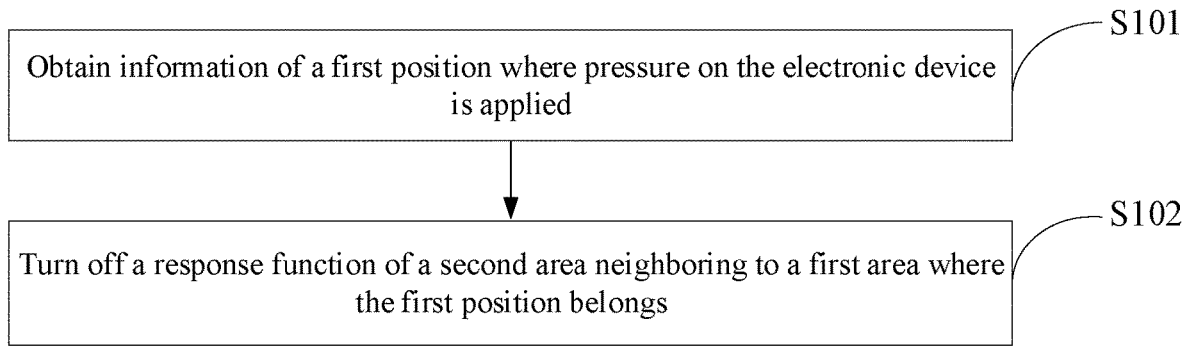
FIG. 1 illustrates a schematic flowchart of a response function control method according to embodiments of the present disclosure.

In practical applications, an execution body of the response function control method of embodiments of the present disclosure may be a server or a processor of an electronic device. To facilitate description, the processor may be used for the detailed description below. FIG. 1 illustrates a schematic flowchart of a response function control method according to embodiments of the present disclosure. The method includes the following processes.

At S101, information of a first position where pressure on the electronic device is applied is obtained.

In some embodiments, the electronic device may include a pressure detection device such as a pressure sensor and/or an elastic force sensor. Whether the pressure exists on the electronic device and the information of the first position where the pressure is applied may be obtained in real-time through the pressure detection device. The information of the first position may be determined with the pressure detection device as an origin or with a determined point on the electronic device as the origin.

At S102, a response function of a second area neighboring to a first area where the first position belongs is turned off.

A whole response area of the electronic device may be divided into a plurality of areas according to different response functions. The first area and the second area may be a touch response area and/or a non-touch response area of the electronic device. For example, when the electronic device is a laptop, a touch response area of a touch screen and a touchpad and a non-touch response area of a keyboard and a mouse may each be regarded as an individual area. For example, a screen that only includes a display function and a cover that has a protection function may not belong to the response area.

After the information of the first position where the pressure on the electronic device is located is obtained, the first area where the first position belongs indicated by the information of the first position may be determined. By using the first area as a basis, the second area neighboring to the first area may be determined. For example, the first area where the first position belongs may be determined to be the keyboard, and the neighboring area may include a touchpad. When the electronic device is a dual-screen laptop, that is, a touchscreen is provided on a side of the keyboard, the area neighboring to the keyboard may include the touchpad and touchscreen. That is, one or more second areas neighboring to the first area may exist.

After the second area neighboring to the first area is determined, the response function of the second area may be turned off. Thus, when an operation is performed in the first area, the problem that the operation efficiency corresponding to the first area is affected due to miss touch of the second area may be avoided, and the problem that the processing resources are wasted due to the false touch of the second area to start the response function of the second area may be avoided.

Figure 2:
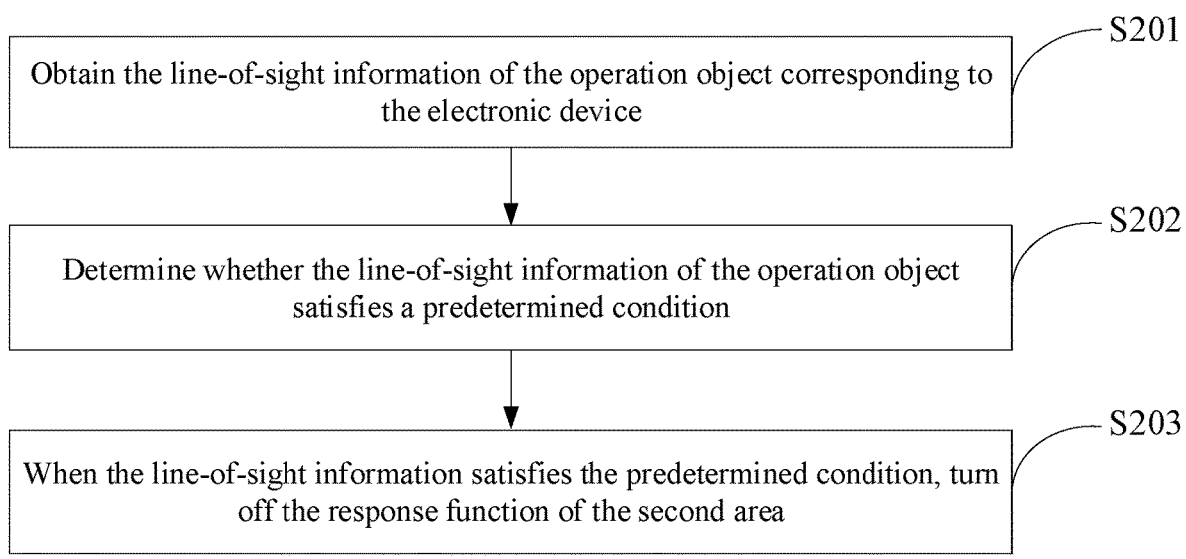
FIG. 2 illustrates a schematic flowchart showing closing a response function of a second area of a response function control method according to embodiments of the present disclosure.

Considering that the line-of-sight information of an operation object corresponding to the electronic device may also affect a result of whether the response function of the second area needs to be turned off, the response function of the second area neighboring to the first area where the first position belongs may be turned off according to the method flowchart shown in FIG. 2. The method includes the following processes.

At S201, the line-of-sight information of the operation object corresponding to the electronic device is obtained.

At S202, whether the line-of-sight information of the operation object satisfies a predetermined condition is determined.

At S203, when the line-of-sight information satisfies the predetermined condition, the response function of the second area is turned off.

In some embodiments, a collection device, such as a camera device, an infrared collection device, etc., may be pre-installed on the electronic device. Thus, human eye information of the operation object may be collected by the collection device installed on the electronic device. Based on the human eye information and the position information of the electronic device, the line-of-sight information may be determined.

The collection device may be started with the startup of an operating system of the electronic device or may be started after the first area where the pressure on the electronic device is located is obtained, which is not specifically limited in embodiments of the present disclosure.

The operation object corresponding to the electronic device may also be determined by the collection device. In some embodiments, if one object is collected by the collection device, the object may be determined as the operation object corresponding to the electronic device. If a plurality of objects are collected by the collection device, an object being closest to the electronic device may be determined, and the object may be determined as the operation object corresponding to the electronic device.

After the line-of-sight information of the operation object corresponding to the electronic device is obtained, whether the line-of-sight information of the operation object satisfies the predetermined condition may be determined. When the line-of-sight information satisfies the predetermined condition, the response function of the second area may be turned off.

Figure 3:
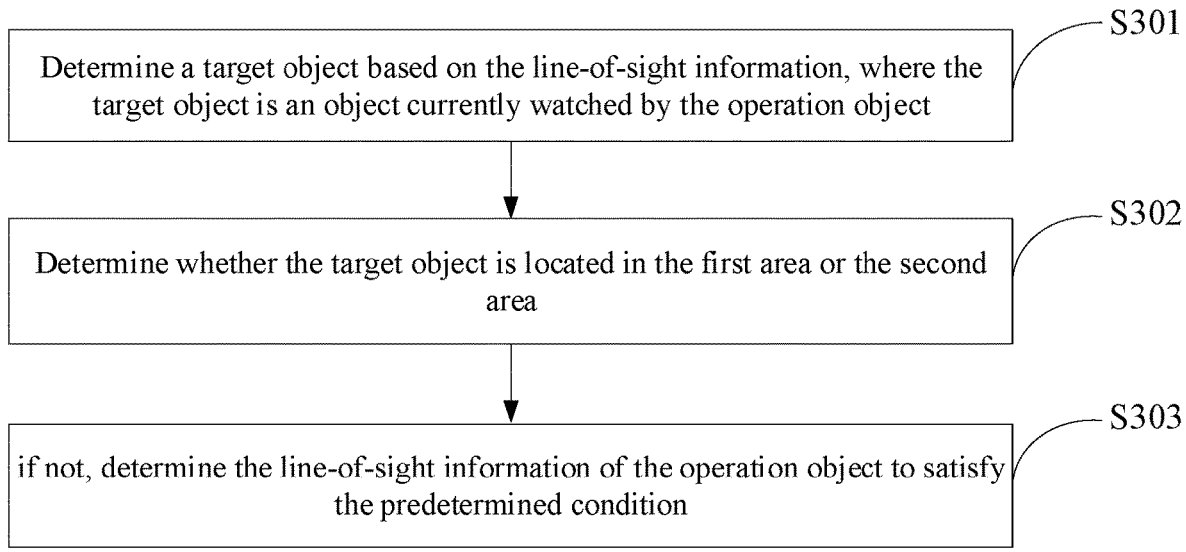
FIG. 3 illustrates a schematic flowchart showing determining whether line-of-sight information of an operation object satisfies a predetermined condition of another response function control method according to embodiments of the present disclosure.

In some embodiments, whether the line-of-sight information of the operation object satisfies the predetermined condition may be determined with reference to the flowchart shown in FIG. 3, which includes the following processes.

At S301, a target object is determined based on the line-of-sight information, where the target object is an object currently watched by the operation object.

At S302, whether the target object is located in the first area or the second area is determined.

At S303, if not, the line-of-sight information of the operation object is determined to satisfy the predetermined condition.

After the line-of-sight information of the operation object corresponding to the electronic device is obtained, an angle of the line-of-sight of the operation object relative to the electronic device may be calculated based on the line-of-sight information. The target object may be determined based on the angle and the shape of the electronic device. The target object may be the object current watched by the operation object.

The target object may be an area and a member of the electronic device or a non-electronic device object. Therefore, whether the target object is located in the first area or the second area may be further determined. If the target object is not located in the first area and in the second area, the line-of-sight information may be determined to satisfy the operation object.

When the line-of-sight information satisfies the predetermined condition, the response function of the second area may be turned off. Thus, the operation efficiency corresponding to the first area may not be affected, and the waste of the processing resources may be avoided. Meanwhile, the second area may respond to the operation of the operation object in time. For example, the first area may be a touchpad, and the second area may be a touchscreen. Thus, if the target object currently watched by the operation object is the touchpad or the touchscreen, the probability that the operation object mistakenly touches the second area may be determined to be low. The operation object may perform the operation on the first area more accurately. Thus, in order to better respond to the operation object, the response function of the second area may be kept enabled. If the target object currently watched by the operation object is determined to be not the touchpad and the touchscreen, the probability that the operation object mistakenly touches the second area may be determined to be higher. Thus, in order to not affect the operation efficiency of the first area and avoid the waste of the processing resources, the response function of the second area may be turned off.

When the target object is located in the first area or the second area, the response function of the second area may be kept turned on. Whether pressure exists in the second area may be further determined. When the pressure exists in the second area, the operation object may not mistakenly touch the second area by ignoring the response to the pressure in the second area. Thus, the purpose of not affecting the operation efficiency corresponding to the first area and avoiding the waste of the processing resources may be also achieved.

After the response function of the second area is turned off, if the pressure on the electronic device does not reach for a predetermined period of time, that is, the operation object no longer performs the operation on the first area, the response function of the second area may be turned on. Thus, when the operation object performs the operation next time, the corresponding area may respond to the operation in time.

In the control method of embodiments of the present disclosure, the first area where the pressure on the electronic device is located may be determined in real-time. Then, the response function of the second area neighboring to the first area may be turned off. Thus, when the user performs the operation on the first area, the user may not mistakenly touch the second area. Therefore, the operation efficiency corresponding to the first area may not be affected, and the waste of the processing resources caused by starting the response function of the second area because the user mistakenly touches the second area may be avoided.

Based on the same concept, a second aspect of the present disclosure also provides an electronic device corresponding to the response function control method. Since the principle of solving the problems by the device of the present disclosure is similar to the above response function control method of the present disclosure, the electronic device may be described with reference to method embodiments, which is not repeated.

Figure 4:
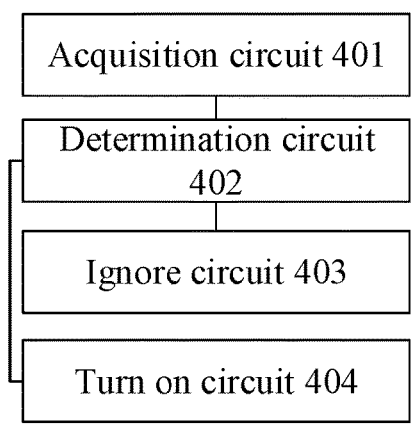
FIG. 4 illustrates a schematic structural diagram of an electronic device according to embodiments of the present disclosure.

FIG. 4 illustrates a schematic structural diagram of an electronic device according to embodiments of the present disclosure. The electronic device includes an acquisition circuit 401 and a determination circuit 402.

The acquisition circuit 401 may be configured to obtain the information of the first position where the pressure on the electronic device is located.

The determination circuit 402 may be configured to disable the response function of the second area neighboring to the first area where the first position belongs.

In some embodiments, the determination circuit 402 may be configured to obtain the line-of-sight information of the operation object corresponding to the electronic device, determine whether the line-of-sight information of the operation object satisfies the predetermined condition, and when the line-of-sight information satisfies the predetermined condition, turning off the response function of the second area.

In some embodiments, the determination circuit 402 may be further configured to collect the human eye information of the operation object through the collection device installed on the electronic device and determine the line-of-sight based on the human eye information and the position information of the electronic device.

In some embodiments, the determination circuit 402 may be further configured to determine the target object based on the line-of-sight information, the target object being the object currently watched by the operation object, determine whether the target object is located in the first area or the second area, and if not, determine that the line-of-sight information of the operation object satisfies the predetermined condition.

In some embodiments, the electronic device further includes an ignore circuit 403, which is configured to when the target object is located in the first area or the second area, determine whether the pressure exists in the second area and when the pressure exists in the second area, ignore the response to the pressure in the second area.

In some embodiments, the electronic device further includes a turn-on circuit 404, which is configured to when the pressure on the electronic device does not reach the predetermined period of time, turn on the response function of the second area.

In the control method of embodiments of the present disclosure, the first area where the pressure on the electronic device is located may be determined in real-time. Then, the response function of the second area neighboring to the first area may be turned off. Thus, when the user performs the operation on the first area, the user may not mistakenly touch the second area. Therefore, the operation efficiency corresponding to the first area may not be affected, and the waste of the processing resources caused by starting the response function of the second area because the user mistakenly touches the second area may be also avoided.

A third aspect of embodiments of the present disclosure further provides a storage medium. The storage medium may be a computer-readable medium and store a computer program. When the computer program is executed by a processor, the processor may be configured to implement the method of embodiments of the present disclosure, including the following processes.

At S11, the information of the first position where the pressure on the electronic device is located is obtained.

At S12, the response function of the second area neighboring to the first area where the first position belongs is turned off.

Figure 5:
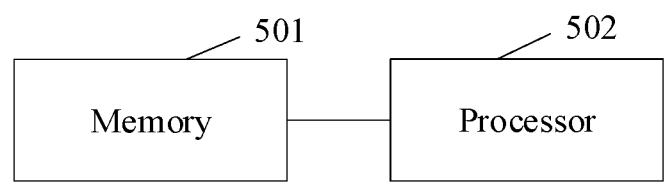
FIG. 5 illustrates a schematic structural diagram of an electronic device according to embodiments of the present disclosure.

A fourth aspect of embodiments of the present disclosure further provides an electronic device. FIG. 5 illustrates a schematic structural diagram of the electronic device according to embodiments of the present disclosure. The electronic device at least includes a memory 501 and a processor 502. The memory 501 stores a computer program. When the computer program is executed by the processor 502, the processor 502 may be configured to implement the method of embodiments of the present disclosure. Exemplarily, the processor 502 may be configured to obtain the information of the first position where the pressure on the electronic device is located (S21) and turn off the response function of the second area neighboring to the first area where the first position belongs.

In some embodiments, the above-mentioned storage medium may include but is not limited to various medium that stores the program codes such as a U disk, a read-only memory (ROM), a random access memory (RAM), a mobile hard disk, a magnetic disk, or optical discs. In some embodiments, the processor may be configured to perform the processes of the method of embodiments of the present disclosure according to the program codes stored in the storage medium. In some embodiments, for specific examples of embodiments of the present disclosure, reference may be made to the above embodiments and examples described in embodiments of the present disclosure, which are not repeated here. Apparently, those skilled in the art should understand that the above-mentioned circuits or processes of the present disclosure may be implemented by a general-purpose computation device and may be integrated on a single computation device or distributed in a network composed of a plurality of computation devices. In some embodiments, the circuits or the processes may be implemented by program codes that are executable by the computation device. Thus, the circuits or the processes may be stored in a storage device and executed by the computation device. In some embodiments, processes that are shown or described may be implemented in a different order than here or may be prepared in various integrated circuit modules. In some other embodiments, a plurality of circuits or processes may be prepared into a single integrated circuit module. Thus, the present disclosure is not limited to any specific combination of hardware or software.

The flowchart and block diagrams in the accompanying drawings illustrate the architecture, functionality, and operation of possible implementations of systems, methods, and computer program products according to various embodiments of the present disclosure. Thus, each block in the flowchart or block diagrams may represent a circuit, program segment, or a portion of codes. The circuit, the program segment, or the portion of codes may include one or a plurality of executable instructions used to implement a determined logical function. In some embodiments, the functions noted in the blocks may occur differently from the order noted in the accompanying drawings. For example, two connected blocks may, in fact, be executed substantially concurrently or may sometimes be executed in a reverse order, which depends upon the functionality involved. Each block of the block diagrams and/or flowchart and a combination of the blocks in the block diagram and/or flowchart may be implemented by a specialized system based on the hardware, which is used to perform the determined function or operation. In some other embodiments, each block of the block diagrams and/or flowchart and a combination of the blocks in the block diagram and/or flowchart may be implemented by a combination of the specialized hardware and the computer instructions.

The above description describes only some embodiments of the present disclosure and the technical principles. Those skilled in the art should understand that the scope of the present disclosure is not limited to the technical solutions formed by a specific combination of the above-mentioned technical features. The scope of the present disclosure also covers other technical solutions formed by the above features or any combinations of the equivalent features without departing from the above-disclosed concept. For example, the technical solution may include a technical solution formed by replacing the above features with the technical features of the present disclosure (but not limited to) with similar functions.

In addition, although the operations are described in a particular order, this should not be construed as requiring the operations to be performed in the particular order shown or in sequence. In some embodiments, multitasking and parallel processing may be advantageous. Similarly, although the above description includes a plurality of specific implementation details, these details should not be construed as limitations on the scope of the present disclosure. Certain features that are described in the context of separate embodiments may also be implemented in combination in a single embodiment. Oppositely, various features that are described in the context of a single embodiment may also be implemented in a plurality of embodiments separately or in any suitable sub-combination.

Although the subject matter has been described in language specific to structural features and/or logical actions, the subject matter defined in the appended claims may not necessarily be limited to the specific features or actions described above. On the contrary, the specific features and actions described above are merely example forms of implementing the claims.

The above embodiments are only exemplary embodiments of the present disclosure and are not intended to limit the present disclosure. The scope of the present disclosure is defined by the claims. Those skilled in the art can make various modifications or equivalent replacements to the present disclosure within the spirit and scope of the present disclosure. These modifications or equivalent replacements should also be within the scope of the present disclosure.

What is claimed is:

1. A response function control method, applied to an electronic device, comprising:
    obtaining information of a first area where pressure on the electronic device is applied by a user, the electronic device being a laptop, the laptop comprising a first input device at the first area and a second input device at a second area neighboring to the first area;
    while maintaining a first touch response function of the first input device to be turned on, turning off a second touch response function of the second input device; and
    after the second touch response function of the second input device is turned off, in response to no operation being performed on the first input device for a predetermined period of time, turning on the second touch response function of the second input device, a relative position between the first input device and the second input device being unchanged.

2. The method according to claim 1, wherein turning off the second touch response function of the second input device includes:

obtaining line-of-sight information of an operation object corresponding to the electronic device;
determining whether the line-of-sight information of the operation object satisfies a predetermined condition; and
in response to the line-of-sight satisfying the predetermined condition, turning off the second touch response function of the second input device.

3. The method according to claim 2, wherein obtaining the line-of-sight information of the operation object corresponding to the electronic device includes:
collecting human eye information of the operation object through a collection device installed on the electronic device; and
determining the line-of-sight information based on the human eye information and position information of the electronic device.

4. The method according to claim 2, wherein determining whether the line-of-sight information of the operation object satisfies the predetermined condition includes:
determining a target object based on the line-of-sight information, the target object being an object currently watched by the operation object;
determining whether the target object is located in the first area or the second area; and
if not, determining that the line-of-sight information of the operation object satisfies the predetermined condition.

5. The method according to claim 4, further comprising:
in response to the target object being located in the first area or the second area, determining whether a pressure exists in the second area; and
in response to the pressure being within the second area, ignoring a response to the pressure in the second area.

6. The method according to claim 1, further comprising:
in response to the pressure on the electronic device not reaching a predetermined period of time, turning on the second touch response function of the second input device.

7. The method according to claim 1, wherein the first input device includes a touchpad or a keyboard, and the second input device includes a touchscreen.

8. An electronic device comprising:
a memory storing a computer program; and
a processor coupled with the memory and, when the computer program is executed, configured to:
obtain information of a first area where pressure on the electronic device is applied by a user, the electronic device being a laptop, the laptop comprising a first input device at the first area and a second input device at a second area neighboring to the first area;
while maintaining a first touch response function of the first input device to be turned on, turn off a second touch response function of the second input device; and
after the second touch response function of the second input device is turned off, in response to no operation being performed on the first input device for a predetermined period of time, turn on the second touch response function of the second input device, a relative position between the first input device and the second input device being unchanged.

9. The electronic device according to claim 8, wherein the processor is further configured to:
obtain line-of-sight information of an operation object corresponding to the electronic device;
determine whether the line-of-sight information of the operation object satisfies a predetermined condition; and
in response to the line-of-sight satisfying the predetermined condition, turn off the second touch response function of the second input device.

10. The electronic device according to claim 9, wherein the processor is further configured to:
collect human eye information of the operation object through a collection device installed on the electronic device; and
determine the line-of-sight information based on the human eye information and position information of the electronic device.

11. The electronic device according to claim 9, wherein the processor is further configured to:
determine a target object based on the line-of-sight information, the target object being an object currently watched by the operation object;
determine whether the target object is located in the first area or the second area; and
if not, determine that the line-of-sight information of the operation object satisfies the predetermined condition.

12. The electronic device according to claim 11, wherein the processor is further configured to:
in response to the target object being located in the first area or the second area, determine whether a pressure exists in the second area; and
in response to the pressure being within the second area, ignore a response to the pressure in the second area.

13. The electronic device according to claim 8, wherein the processor is further configured to:
in response to the pressure on the electronic device not reaching a predetermined period of time, turn on the second touch response function of the second input device.

14. A non-transitory computer-readable medium storing a computer program that, when executed by a processor, causes the processor to:
obtain information of a first area where pressure on the electronic device is applied by a user, the electronic device being a laptop, the laptop comprising a first input device at the first area and a second input device at a second area neighboring to the first area;
while maintaining a first touch response function of the first input device to be turned on, turn off a second touch response function of the second input device; and
after the second touch response function of the second input device is turned off, in response to no operation being performed on the first input device for a predetermined period of time, turn on the second touch response function of the second input device, a relative position between the first input device and the second input device being unchanged.

15. The computer-readable medium according to claim 14, wherein the processor is further configured to:
obtain line-of-sight information of an operation object corresponding to the electronic device;
determine whether the line-of-sight information of the operation object satisfies a predetermined condition; and
in response to the line-of-sight satisfying the predetermined condition, turn off the second touch response function of the second input device.

16. The computer-readable medium according to claim 15, wherein the processor is further configured to:

collect human eye information of the operation object through a collection device installed on the electronic device; and determine the line-of-sight information based on the human eye information and position information of the electronic device.

17. The computer-readable medium according to claim 15, wherein the processor is further configured to:

determine a target object based on the line-of-sight information, the target object being an object currently watched by the operation object;

determine whether the target object is located in the first area or the second area; and if not, determine that the line-of-sight information of the operation object satisfies the predetermined condition.

18. The computer-readable medium according to claim 17, wherein the processor is further configured to:

in response to the target object being located in the first area or the second area, determine whether a pressure exists in the second area; and in response to the pressure being within the second area, ignore a response to the pressure in the second area.

19. The computer-readable medium according to claim 14, wherein the processor is further configured to:

in response to the pressure on the electronic device not reaching a predetermined period of time, turn on the second touch response function of the second input device.

* * * * *